March 7, 1950 G. L. INGRAM 2,500,078
FISHING FLOAT
Filed Feb. 20, 1946
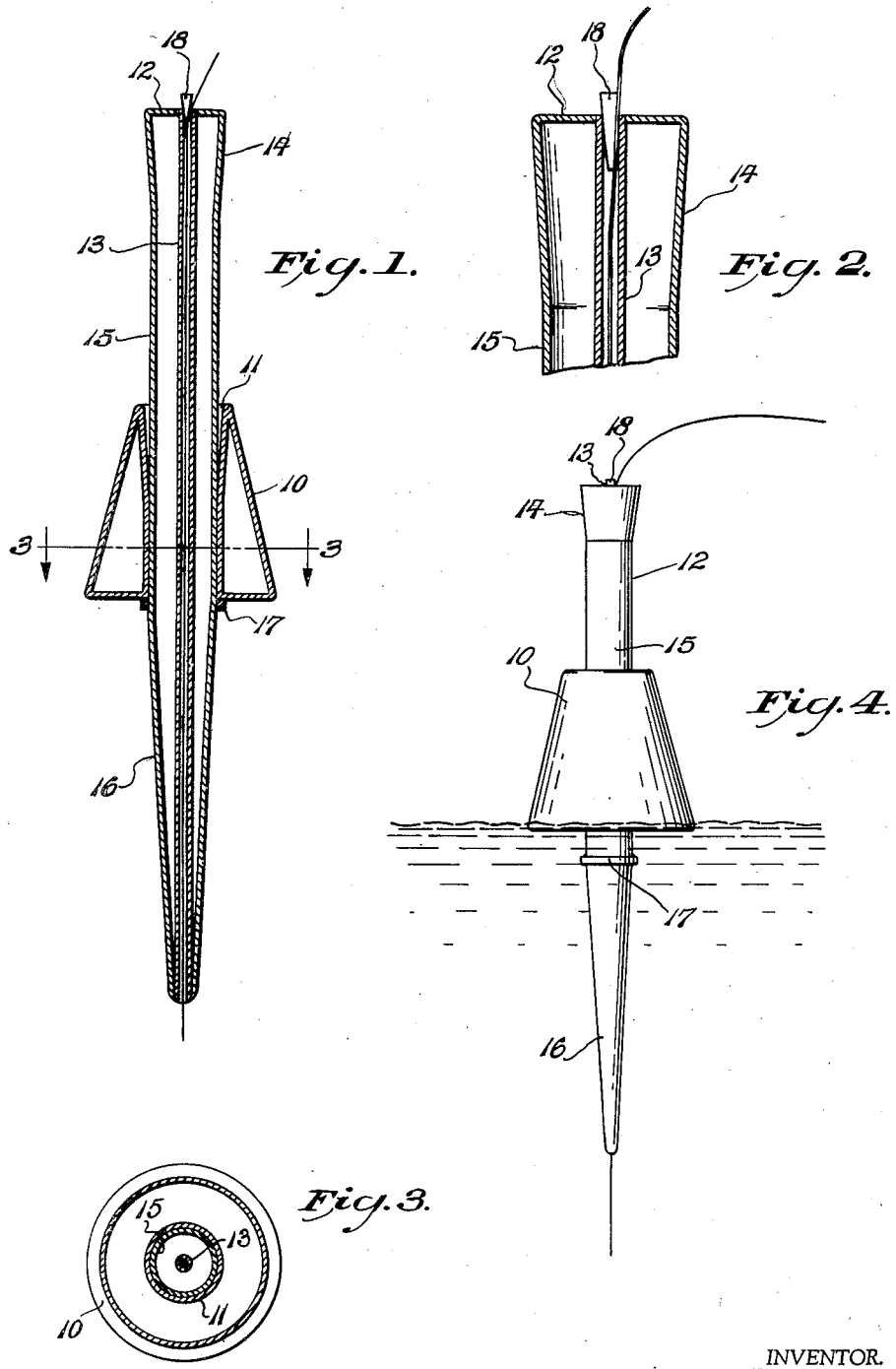
INVENTOR.
George L. Ingram
ATTORNEY.

Patented Mar. 7, 1950

2,500,078

UNITED STATES PATENT OFFICE 2,500,078

FISHING FLOAT

George L. Ingram, Worthington, Ohio

Application February 20, 1946, Serial No. 648,843

3 Claims. (Cl. 43—44.91)

My invention relates to fishing floats, and more specifically to fishing floats of the type constituting a stem inserted in a buoyant body.

In the past, fishing floats of the above mentioned type normally comprise a buoyant float body with a firmly fitting stem inserted therethrough. In floats of this type, a fishing line is fastened to the float in a suitable manner so as to cause the float to disappear below the surface of the water upon the biting of a fish.

It is an object of my invention to provide a fish float comprising a relatively stationary float body having a vertically movable stem, the stem being subject to movement, independent of the float body, upon the striking of a fish on an associated line.

It is another object of my invention to provide a fish float of this character which, due to its relatively movable parts, stimulates an interest and creates a degree of novelty for the fisherman.

For a further understanding of my improved fishing float, reference is made to the following description and accompanying drawings, wherein:

Fig. 1 is a vertical sectional view taken through the fishing float;

Fig. 2 is an enlarged vertical sectional view of the upper end portion of the stem element;

Fig. 3 is a horizontal sectional view taken along the line 3—3 of Fig. 1; and

Fig. 4 is a side elevational view of the fishing float on water.

With reference to the drawings, it will be seen that my invention makes use of a hollow buoyant body 10 having an internal tapered bore 11, and a relatively circular hollow stem member 12 capable of being closed at either end and formed with an internal open line-receiving tube 13. The upper portion 14 of the stem 12 tapers inwardly to form a shaft portion 15 which in turn extends for a length and tapers inwardly to form a second or lower tapered portion 16.

The tapered bore 11 of the body 10 freely fits around the shaft portion 15 of the stem and is longitudinally movable thereover between the limits imposed by the upper tapered portion 14 and a circular stop-collar 17 rigidly attached to the stem at the juncture of the shaft portion 15 and the lower tapered portion 16. The diameter of the upper end of the bore 11 is substantially the same size as the upper end of the stem 12 and thereby allows the upper end of the stem to fit flush with the top surface of the body 10 when the stem is drawn downwardly through the body to the limit imposed by the upper tapered portion 14.

In use, a fishing line is inserted in the upper end of the tube 13 and threaded through the tube to any desired length. A small wedge element 18 is then inserted into the upper open end of the tube to rigidly secure the line at its desired length or depth to the float. After the line is thus secured, a bait-hook and suitable sinkers are attached to the free end of the line. With reference to Fig. 4 of the drawings, it will be seen that the float will be buoyantly supported in a substantially vertical position upon the surface of the water by the weight of the hook and sinkers. The buoyancy of the hollow stem is such as to allow the greater portion of the shaft 15 and the entire upper tapered portion 14 of the stem to be viewable above the top of the body 10.

It will be seen that, as a fish strikes the lower end of the line, the attached stem will move downwardly through the bore of the body until the top of the stem is flush with the top surface of the body; the body then is subject to the downward pull on the line and will disappear from sight below the surface of the water. Thus the striking of a fish is indicated, first, by the disappearance of the stem within the buoyant body and, secondly, by the disappearance of the entire float.

In view of the foregoing, it will be seen that my invention provides a fishing float which creates a degree of novelty by nature of its relatively movable parts.

My invention is characterized by its simplicity of construction, and its economy of manufacture.

It will be manifest that while I have disclosed what I now deem to be the preferred form of my invention, certain changes in design and details of construction may be later accomplished without departing from the spirit of the invention or the scope of the following claims.

I claim:

1. A fishing float comprising an elongated hollow stem formed with concentrically spaced longitudinally coextensive inner and outer walls, the spacing between the inner and outer walls defining an enclosed buoyant chamber, the inner wall of said stem defining an open-ended longitudinally extending passageway for the reception of a fishing line, said stem being formed at one end with a relatively enlarged shoulder, a stop collar carried upon said stem in longitudinally spaced relation to the enlarged shoulder thereof, and a hollow buoyant body formed with a centrally disposed and longitudinally extending bore and carried upon said stem for free sliding movement between the enlarged shoulder thereof and said stop collar.

2. A fishing float comprising an elongated hollow stem closable at either end and formed with an axially disposed and longitudinally coextensive passageway for the reception of a fishing line, the passageway being defined by an inner cylindrical wall extending longitudinally and axially of said stem, a pair of longitudinally spaced and relatively enlarged stops arranged upon the outer surface of said stem, and a hollow buoyant body mounted on said stem for free sliding movement between said stops.

3. A fishing float comprising an elongated hollow stem closable at either end and formed with an axially disposed and longitudinally coextensive passageway for the reception of a fishing line, the passageway being defined by an inner cylindrical wall extending longitudinally and axially of said stem, a pair of longitudinally spaced and relatively enlarged stops arranged upon the outer surface of said stem, and a hollow buoyant body mounted on said stem for free sliding movement between said stops, said body being formed with a flat bottom surface for support upon a body of water.

GEORGE L. INGRAM.

REFERENCES CITED

The following references are of record in the file of this patent:

UNITED STATES PATENTS

| Number | Name | Date |
|---|---|---|
| 771,263 | McCord | Oct. 4, 1904 |
| 1,468,720 | Low | Sept. 25, 1923 |

FOREIGN PATENTS

| Number | Country | Date |
|---|---|---|
| 15,097 | Great Britain | A. D. 1884 |
| 474,642 | Great Britain | Nov. 4, 1937 |